UNITED STATES PATENT OFFICE.

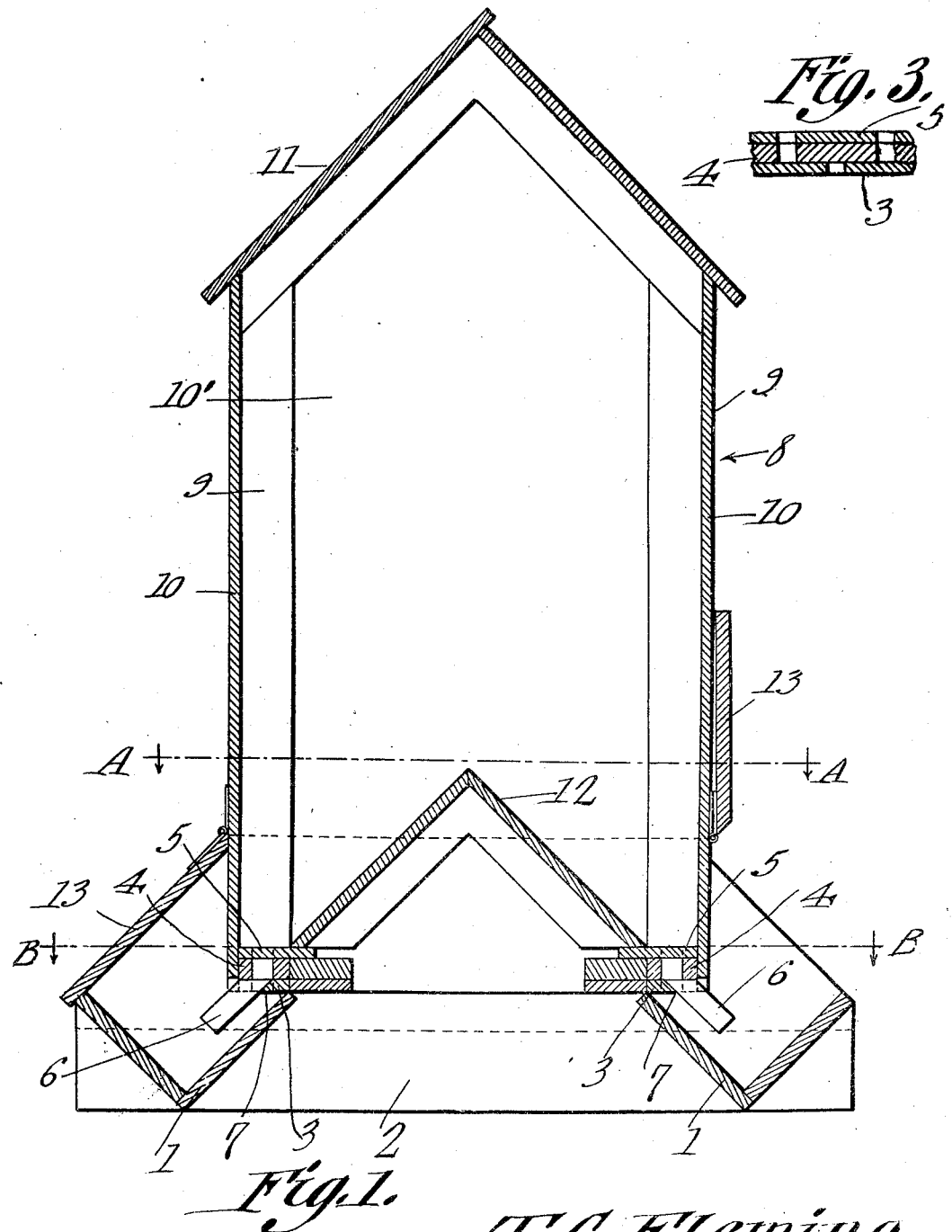

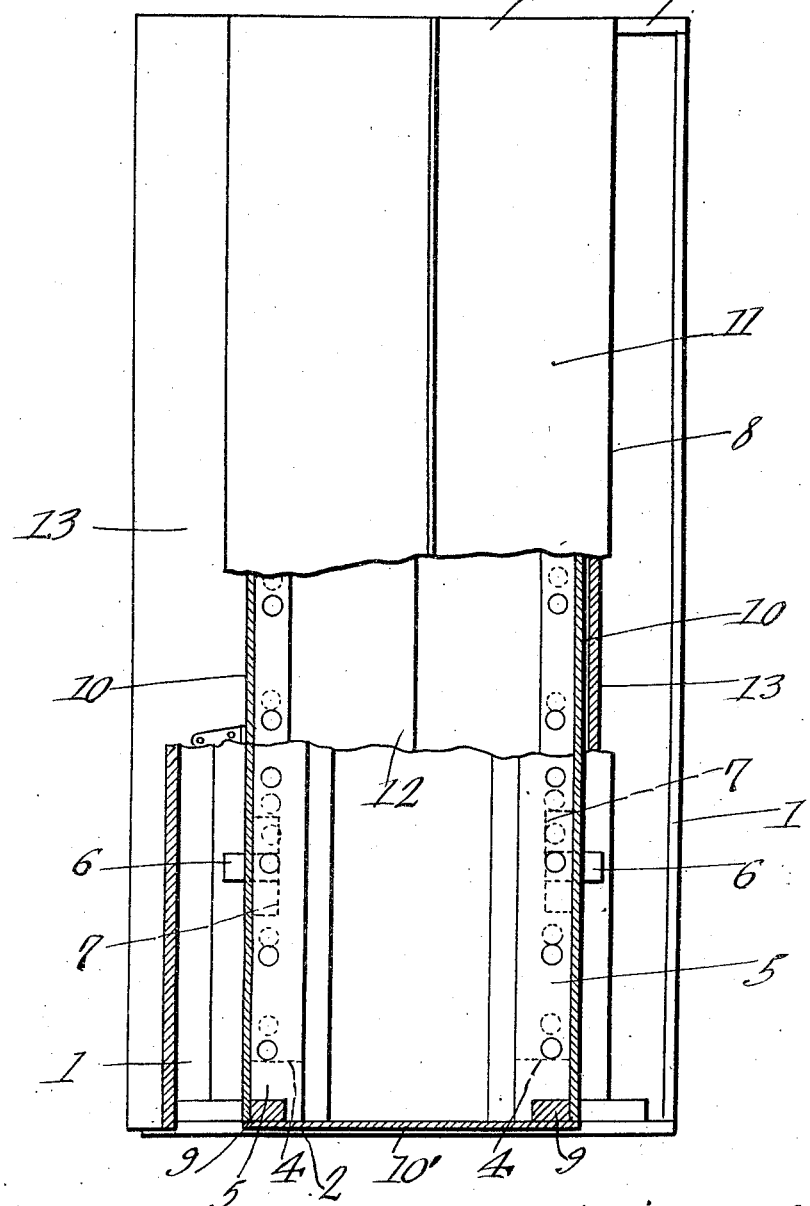

THOMAS C. FLEMING, OF STOPPINGTON, ALBERTA, CANADA.

ANIMAL-FEEDER.

1,120,920.

Specification of Letters Patent.   Patented Dec. 15, 1914.

Application filed April 1, 1914. Serial No. 828,809.

*To all whom it may concern:*

Be it known that I, THOMAS C. FLEMING, a citizen of the United States, residing at Stoppington, in the Province of Alberta and Dominion of Canada, have invented a new and useful Animal-Feeder, of which the following is a specification.

The present invention appertains to animal or live stock feeders, and aims to provide a novel and improved appliance of that character.

It is the object of the present invention to provide an automatic feeder for hogs, or other animals or live stock, and which includes unique feeding means for regulating the supply of feed from the bin to the feeding trough or troughs.

Another object of the present invention is to provide an automatic feeder of novel and improved construction, the several component parts being arranged or assembled in a peculiar manner, to carry out the results desired in the most efficacious and desirable manner, the present device being comparatively simple, and inexpensive in construction, as well as being simple, convenient, practical and efficient in use.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention has been illustrated in its preferred embodiment in the accompanying drawing, wherein:—

Figure 1 is a transverse vertical section of the improved feeder. Fig. 2 is a plan view thereof, on a slightly reduced scale, portions thereof being shown in section on the respective section lines A—A and B—B, of Fig. 1. Fig. 3 is a fragmental sectional detail of one of the feeding devices.

In carrying out the present invention, there is provided a pair of parallel spaced troughs 1, of V-shaped cross section, and having their ends secured to end pieces 2. The said troughs and end pieces form the foundation of the feeder, so as to support the superstructure.

A longitudinal bar or board 3 is secured over the inner edge or side of each of the troughs 1, and has its ends or terminals secured to the end pieces 2, the boards or bars 3 overhanging the inner sides of the troughs, and each having a longitudinal series of apertures therein. Longitudinally slidable bars 4 are mounted upon the bars 3 and each is provided with a longitudinal series of apertures, while longitudinal bars or boards 5 are secured rigidly above the slidable bars 4, and are each provided with a longitudinal series of apertures out of alinement with the apertures of the lower bar 3. The bars 3 and 5 are stationary or rigid, and serve as guides for the sliding bars or shutters, the apertures of the shutters 4 being adapted to be brought into and out of registration with the apertures of the guide bars 3 and 5 when the shutter or valve bars 4 are slid longitudinally. The uppermost or superposed guide bars 5 are terminally secured to the end pieces 2 and are rigidly supported in any suitable manner.

Inclined members or pieces 6 are secured to the bottom of the shutter or valve bars 4, and depend above the inner sides of the troughs 1, and work through slots or cut away portions 7 formed in the outer edges of the lower guide bars 3, whereby the members 6 working within the slots 7, will limit the longitudinal sliding movements of the valve bars 4.

A feed bin 8 is mounted over the space between the troughs 1, and over the two feeding devices above the inner sides of the troughs, comprising the stationary and slidable apertured bars. The bin 8 comprises corner uprights or standards 9 attached to the end pieces 2, sides 10 secured to the uprights 9 and projecting over the outer edges of the bars 4 and 5, ends 10' secured to the uprights 9 and to the end pieces 2, and a roof or top 11 mounted upon the uprights. The bin 8 is provided with a bottom 12 of an inverted V-shape in cross section, disposed longitudinally between the ends 10' and having its sides secured upon the upper guide bars 5 adjoining their inner edges.

Doors or closures 13 are hinged to the sides 10 of the bin, and are arranged to swing downwardly over the outer sides of the troughs 1, to close the troughs, the troughs being opened when the doors 13 are swung upwardly against the sides of the bin, as will be apparent from the drawings.

In use, the shelled corn or other feed is supplied to the bin 8, and is delivered down the inclined sides of the bottom 12 of the bin, to the opposite feeding devices, which overhang the inner sides or walls of the troughs. When the doors 13' are raised, the troughs will be uncovered, in order that the hogs or other animals may eat therefrom. Then as the animals move along the troughs, the members 6 will be moved longitudinally by the heads of the animals, to slide the valve or shutter bars 4. The valve or shutter bars 4 being slid back and forth will bring the apertures of the valve bars 4 into and out of registration with the apertures of the rigid bars 3 and 5, whereby the feed will be fed or delivered through the feeding devices into the troughs. In this manner, the hogs or other animals when eating from the trough, and in nosing about the trough, will automatically actuate the feeding devices, in the manner indicated. The apertures of the valve bars and guide bars are preferably spaced irregularly, whereby the various apertures will be brought into registration at different positions of the valve bars 4, whereby the feed will be dropped at various points into the troughs, to cause the animals to move about in eating, and to thereby engage the actuating members 6 for continually or intermittently actuating the feed devices, while the animals are eating.

In order that the troughs 1 may be closed during stormy or bad weather, or when it is desired to prevent the animals from feeding, the doors 13 are swung down over the troughs 1, whereby the animals cannot have access thereto, until the doors 13 are again raised. The doors 13, when closed, will serve to shed rain over the outer sides of the troughs, and will protect the troughs and feeding devices from the elements.

The present structure is comparatively simple and inexpensive, and may be readily constructed from lumber, the device being capable of construction in various sizes and proportions. The present structure is devoid of any encumbering or protruding parts, which might interfere with the animals while eating, and the present device is otherwise of advantage, as will be obvious to those versed in the art.

Having thus described the invention, what is claimed as new is:—

1. An animal feeder comprising a trough, a feeding device including a longitudinal perforated bar secured over one side of the trough, and a longitudinal perforated shutter bar slidable upon the first mentioned bar, the first mentioned bar having a slot, and the shutter bar having a depending projection movable within the said slot and entering the trough to be moved longitudinally within the trough by the animals eating therefrom, and a bin disposed above the feeding device and communicating therewith.

2. An animal feeder comprising a pair of spaced troughs, feeding devices overhanging the inner sides of the troughs and including movable shutters having actuating members projecting into the troughs, and a feed bin mounted over the feeding devices and including an inverted V-shaped bottom having its sides attached to the feeding devices.

3. An animal feeder comprising a pair of spaced troughs, upper and lower perforated guide bars secured above the inner side of each trough, a perforated valve bar slidable between the guide bars of each pair and having actuating means projecting into the corresponding trough, and a feed bin mounted over the troughs and including sides projecting over the outer edges of the said bars, the bin including an inverted V-shaped bottom having its sides secured to the inner edges of the upper guide bars.

In testimony that I claim the foregoing as my own, I have hereto affixed my signature in the presence of two witnesses.

THOMAS C. FLEMING.

Witnesses:
W. C. ROBINSON,
L. K. STEIN.

Copies of this patent may be obtained for five cents each, by addressing the "Commissioner of Patents Washington, D. C."